United States Patent [19]
Laiho

[11] 4,009,118
[45] Feb. 22, 1977

[54] METHOD AND APPARATUS FOR USING FROTH PREVENTIVES

[75] Inventor: Reino Laiho, Pori, Finland
[73] Assignee: Rauma-Repola Oy., Finland
[22] Filed: Aug. 14, 1975
[21] Appl. No.: 604,876
[52] U.S. Cl. .............................. 252/321; 252/361; 55/178
[51] Int. Cl.² .......................................... B01D 19/04
[58] Field of Search .............. 252/321, 361; 55/178

[56] References Cited
UNITED STATES PATENTS

| | | | |
|---|---|---|---|
| 1,603,507 | 10/1928 | Beveridge | 252/361 |
| 2,184,195 | 12/1939 | Naucier | 252/361 |
| 2,800,459 | 7/1957 | Dijksman et al. | 252/361 |
| 3,224,964 | 12/1965 | Derenk et al. | 252/361 |
| 3,679,600 | 7/1972 | Hahm | 252/321 |

Primary Examiner—Richard E. Schafer
Attorney, Agent, or Firm—Burns, Doane, Swecker & Mathis

[57] ABSTRACT

A method for breaking or extinguishing foam on a body of foam-forming liquid, requiring only a fraction of the amount of foam breaker used in conventional procedures, comprises initially adding a small amount of a catalyst-like foam preventive agent to extinguish the foam, then recycling the resulting foam preventive-containing liquid to contact fresh foamed liquid. Recycling continues until the foam preventive, due to dilution, becomes substantially ineffective, whereupon defoamed liquid, containing diluted preventive, is withdrawn from the system, a fresh amount of foam preventive is introduced, and the cyclic procedure repeated. Apparatus for performing the process is also disclosed.

10 Claims, 1 Drawing Figure

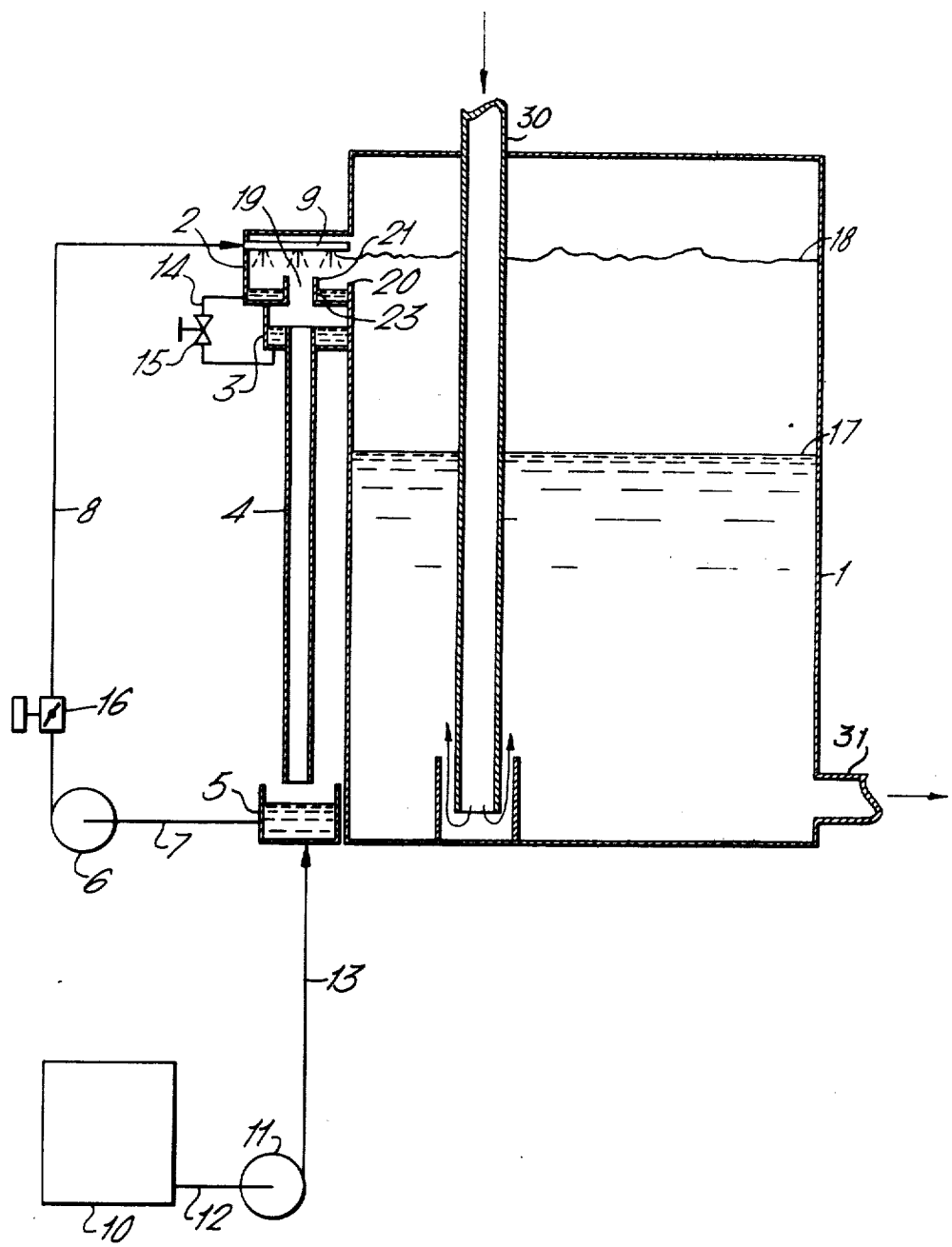

METHOD AND APPARATUS FOR USING FROTH PREVENTIVES

This invention relates to a new method and an apparatus for using froth or foam preventive agents in order to extinguish detrimental foam or froth.

Particularly in the washing of sulfate cellulose pulp after cooking, the detrimental effect of the foam formed has been one of the most difficult problems. In order to extinguish the foam, that is to convert the liquid, which is in foam form back to its normal liquid form, and/or to keep it in this form, mechanical means that break bubbles, or various foam preventive agents that are mixed with the foam forming liquid, have been used.

As is known, foam preventives contain agents which increase the surface tension of the foam-forming liquid, and decrease the viscosity; and the strength of foam bubbles. Generally, foam preventives do not have detrimental effects such as changing the properties of the foam forming liquid. Natural products can be used as foam preventives; but today synthetic products, such as higher alcohols, esters, sulfonates, sulfates, amines, amides or silicones, are mostly used.

Use of foam preventives in liquid or dissolved form has in practice proved to be the most effective way of improving washing under foaming conditions. The only drawback of using foam preventive agents is their high price.

This invention is based on the discovery that some foam preventives act as catalysts, not as components taking part directly in the reaction thereby being consumed in the process, as had generally previously been assumed. As a result, the effective duration of these catalyst-like foam preventives appears to be fairly long, the foam preventives retaining their activity for as long as 16 to 70 hours, according to tests. Even in this case, the decreasing effectiveness of the foam preventives probably is at least partly due to dilution, in other words to the decrease of the concentration of foam preventive in the foam-forming liquid as a result of such liquid being added during the process. In these tests the foam-forming liquid was sulfate liquor and liquid formed from its foam. Distributors and consumers of foam preventive agents are generally of the opinion that the effective life of these agents is rather short. In prior art methods, the foam preventive has been added counter current to filtrate flowing through the washing section. In such prior art methods the effective life of the foam preventive does not have the same importance as in the circulating method of the present invention. In order that the invention may be better understood, reference is made to the description which follows and to the single figure of drawing which is a schematic representation of a section, along a vertical plane of a prefrred form of apparatus for carrying out the process of the present invention. The method according to the present invention is mainly characterized in that a mixture containing foam preventive and foam-forming liquid and/or liquid formed of foam is brought into contact with the foam to be extinguised, and after extinguishing of the foam, the mixture thus obtained, which contains foam preventive and liquid formed from the foam is collected and again brought into contact with the foam to be extinguished.

Further in accordance with the present invention, as the effectiveness of the foam preventive diminishes because the liquid formed from the foam dilutes it, liquor thus formed which is free from foam and practically non-foaming can be led off from the process, and untreated foam taken for treatment by a mixture of foam preventive and liquid formed from foam, into which mixture fresh foam preventive has been added.

The invention also relates to an apparatus for carrying out the method. The apparatus in general, comprises a first basin for bringing together the foam, a mixture containing foam preventive, and foam-forming liquid and/or liquid formed from the foam; a second basin for recovering the liquid thus formed; pump and pipes for recirculating the liquid from the second basin to the first basin; and means for charging foam preventive into one or several of the above devices.

In the apparatus according to the invention, the foam preventive effect of the same portion of preventive agent is repeatedly utilized to a desired extent in such a way that the foam-forming liquid with the foam preventive that has been added to it together with foam, can be caused to run down a substantially vertical or a slanted surface, for instance along the inner wall of a tube, which also tends to make the foam extinguishing more effective. In this way the effect of the foam preventive agent is utilized thoroughly and so the operation costs caused by foam preventive area reduced.

Referring specifically to the single FIGURE of drawing, the apparatus there shown illustrates an embodiment of a foam prevention system in a sulfate washing section.

The apparatus comprises an inlet pipe 30 and a filtrate basin 1, containing liquor obtained from filtering. Upper basins 2 and 3 are arranged on the side of the filtrate basin 1. A tubelike opening 19 in the basin 2 opens to the basin 3 below. A connecting tube 4 connects the basin 3 to a lower basin 5. As seen in the drawing the lower ends of the side walls of the tube-like openings 19 end above the side walls of the tube 4 so that foam flowing from opening 19 drips along the walls of tube 4. The tube 4 ends at the upper part of the basin 5. A pump 6 is connected by means of a suction pipe 7 to the lower basin 5 and by means of a pressure pipe 8 to spray means 9 above the basin 2.

A storage container 10 for foam preventive agent is connected to lower basin 5 through pump 11, suction pipe 12 and pressure pipe 13. Basins 2 and 3 are connected with each other through pipe 14 and valve 15. A control valve 16, which controls the spray means 9, is actuated by an impulse depending on the height of the liquid surface level in the lower basin 5 by means of conventional devices (not shown in the drawing) which tend to keep the height of the liquid surface level in basin 5 nearly constant.

The upper surface of the liquid in essentially non-foaming state in the filtrate container 1 is shown with a dashed line 17, and the upper surface of the foam above is shown by a line 18.

The above described apparatus operates as follows: When the surface 18 of the foam in the filtrate container 1 rises to a certain level, the foam flows under the spray means 9, from which a mixture of foam preventive and filtrate is sprayed on the latter causing the foam to be extinguished. The spray means 9 is a pipe or a set of pipes having several nozzles or holes from which the mixture is sprayed to several points in the foam below. The holes and nozzles are positioned and shaped so that the spray or droplets coming out from them contact the foam over a very wide area. The liquid or liquor formed from the foam is collected in the basin 2. From this basin the liquor is led through the pipe 14 and the valve 15 to the basin 3 from where the liquor runs over the upper edge of the connecting tube 4 to the inside of the tube and from there into the basin 5. In the tube 4 the liquor runs down as a layer at least partially covering the inner wall of the tube. The pump 6 pumps the filtrate liquor through the valve 16 to the spray means 9. By means of the valve 16 the surface level is kept constant in the basin 5. Thus the same liquor is circulated through the system for a longer time.

The charging pump 11, either continuously or intermittently pumps a required amount of fresh foam preventive agent from the storage container 10 to the lower basin 5. The excess liquor formed from the extinguished foam and the foam preventive agent flows over the edge of 20 upper basin 2 back to the container 1, were the foam preventive continues to function mixed with the filtrate liquor, The circulating rate of the liquid, and at the same time the thickness of the liquid layer running down the inner wall of tube 4 are controlled by means of valve 15. The foam that has not been extinguished in the upper basin 2, runs down through the open tube 19 to the tube 4. In the tube 4 the foam comes to contact with the liquid running down the side walls of the tube. The liquid surface on the walls is fairly wide and thus the liquid also extinguishes the foam very effectively.

By means of fans, for instance, or similar devices, the pressure differneces in the filtrate container and the devices connected to it can be adjusted such that the flow of gas is from the filtrate container 1 outwards through the tube 4. In this way the foam flow can be made a forced flow according to the glass flow, the latter also carrying excess foam through open 19 from the basin 2 to tube basin 3 and further to tube 4. The upper edge 21 of tube 23 is higher than the open upper edge 20 of the basin 2.

In this way foam, but not liquid, can run down through the opening 19, but not the liquid, the excess liquid running down to the container 1 over the edge 20. The liquid is withdrawn from container 1 through outlet pipe 36.

The apparatus according to the present invention is not restricted to the above described embodiment and it can vary considerably with the scope of the claims. This applies especially to the positioning and shaping of the spray means, tubes, pipes and containers. In the method of this invention it is possible to use either a mixture of foam preventive and liquid formed from foam only, or a mixture of foam preventive, foam-forming liquid and liquid formed from foam.

The method of the invention can be carried out, for instance, with the following synthetic foam preventive agents: "DREW L 900" (Drew Chemical Coporation); "NALKO" (Nalko Chemical Company); and "HERCULES" (Hercules Bauer).

One embodiment of the invention is described in the following example by way of illustration. The possibilities for using the method of the invention are however, not restricted to this example, as the invention can be applied to all those problem situations where formerly the large required amounts of foam preventive agents limited the possibilities of using these agents.

EXAMPLE

After the cooking of sulfate cellulose, the pulp is thickened and washed on the drum of a washer. The filtrate liquor or black liquor separated from the pulp suspension is led to the container 1. The volume of the container 1 is 300 $m^3$, and the level of the surface of the black liquor is slightly above half way. The foam formed in the washing is also led to the container 1, and settles on the surface of the black liquor. Foam is formed to such an extent that it overflows into basin 2. The treatment of the foam which has risen to the basin 2 is started with liquid formed from the foam which also contains foam preventive DREW L 900. This mixture is sprayed into the foam by the spraying means 9. The control pump 10 charging the foam preventive is adjusted to deliver the smallest possible amount which still causes the foam to be extinguished. The consumption of the foam preventive is only a fraction, less than 25%, of what it would be should the foam preventive be led into the whole filtrate, as is usual according to the prior art. When using prior art methods, consumption of the foam preventive can be even 0,4 kg per 1 ton of washed, 90% pulp.

Below there is tabulated the data from a series of tests carried out in a laboratory and it shows how the effect of the foam preventive did not essentially decrease as a function of time. The test liquid was a mixture of sulfate liquor and 0,008% of DREW L 900. The temperature was 90° C.

| Age of Liquor | Foam Extinguishing Time |
|---|---|
| 0 min | 0,25 min |
| 15 min | 0,25 min |
| 30 min | 0,25 min |
| 1,5 h | 0,2 min |
| 3 h | 0,3 min |
| 16 h | 0,56 min |
| 70 h | 1,1 min |

I claim:
1. A method for distinguishing foam on a body of foam-forming liquid and for rendering said liquid non-foaming and suitable for handling or subsequent treatment, said method comprising:
   a. forming a first treating mixture containing a catalyst-like foam preventive agent and a member of the group consisting of a foam-forming liquid, liquid formed from extinguished foam of said foam-forming liquid, and mixtures of said foam-forming liquid and extinguished foam;
   b. collecting a foamed body of said foam-forming liquid in a reservoir zone, said body of liquid having a layer of foam floating thereon;
   c. transferring a portion of said floating foam from said reservoir zone to a treating zone, said treating zone and said reservoir zones comprising separate liquid-handling systems;
   d. contacting said transferred foam in said treating zone with said first treating mixture to extinguish said foam to form a second treating mixture in said treating zone diluted with respect to foam preventive agent, said second treating mixture comprising said first treating mixture and liquid formed from said extinguished foam;
   e. repeatedly circulating at least a portion of said foam preventive-containing treating mixtures within said treating zone while contacting said treating mixture with successive bodies of fresh foam withdrawn from the surface of the liquid in the reservoir zone, thereby extinguishing said foam while forming a succession of circulating treating mixtures within said treating zone containing progressively diluted foam preventive agent in said mixtures thereby diminishing the effectiveness of said foam preventive agent;

f. withdrawing portions of said circulating treating mixture containing diluted foam preventive agent from said treating zone;

g. adding said withdrawn portions of the body of liquid in said reservoir zone; and h. adding fresh foam preventive agent to the remaining circulating treating mixture in the treating zone in an amount sufficient to regain an effective foam extinguishing concentration.

2. The method of claim 1 wherein said foam preventive-containing mixtures circulating in the treating zone are repeatedly contacted in their entirety with successive bodies of foam from the liquid in the reservoir zone before portions of the defoamed liquid containing diluted foam preventive agent are withdrawn from said treating zone.

3. The method of claim 1 wherein fresh foam preventive is constantly added to the mixtures circulating in the treating zone at a rate sufficient to retain an effective foam extinguishing concentration.

4. The method of claim 1 wherein fresh foam preventive agent is intermittently added to the circulating mixtures in the treating zone.

5. The method of claim 1 wherein the circulating foam preventive-containing treating mixture is sprayed over a wide area of the foam transferred to the treating zone from the foamed liquid in the reservoir zone.

6. The method of claim 1 wherein the circulating foam preventive-containing mixture and foam are contacted while flowing down a vertical or slanted surface in the treating zone.

7. The method of claim 6 wherein the flow of foam is assisted by flowing air.

8. Apparatus for extinguishing foam floating on a body of foam-forming liquid comprising:

a. a reservoir for receiving a body of foam-forming liquid having a layer of foam thereon;

b. a first receptacle having communicating means connecting said first receptacle with an upper part of said reservoir for receiving overflow of foam from said reservoir;

c. a second receptacle disposed beneath said first receptacle having first connecting means for permitting gravity flow of liquid between said first and second receptacles, said first connecting means having edges extending upward into said first receptacle to form trough-like means for collection of liquid therein, the edges of said first connecting means being at a higher level than the communicating means between said reservoir and said first receptacle;

d. elongated discharge means extending generally vertically downward from said second receptacle, said elongated discharge means being of sufficient diameter to permit gravity flow of foam and liquid therethrough, said elongated discharge means also extending upward into said second receptacle;

e. nozzle means in said first receptacle for directing foam extinguishing composition into foam overflowing from the reservoir;

f. a third receptacle disposed beneath said elongated means to receive a liquid mixture of foam extinguishing agent and extinguished foam; and g. means for recycling said liquid mixture to said nozzle means.

9. The apparatus of claim 8 having a source of fresh foam extinguishing agent and means for transferring fresh foam extinguishing agent from said source to said liquid mixture of foam extinguishing agent and extinguished foam.

10. The apparatus of claim 9 wherein said source of fresh foam extinguishing agent is connected to said third receptacle.

* * * * *